US012596505B2

(12) United States Patent
Ogihara et al.

(10) Patent No.: US 12,596,505 B2
(45) Date of Patent: Apr. 7, 2026

(54) COMPUTER-READABLE RECORDING MEDIUM HAVING STORED THEREIN INFORMATION PROCESSING PROGRAM, INFORMATION PROCESSING METHOD, AND INFORMATION PROCESSING APPARATUS

(71) Applicant: Fsas Technologies Inc., Kawasaki (JP)

(72) Inventors: Kazutaka Ogihara, Hachioji (JP); Takashi Shiraishi, Atsugi (JP); Masato Otsuka, Kawasaki (JP); Naoya Nishio, Hadano (JP); Hiromi Fukumura, Minato (JP); Reiko Kondo, Yamato (JP)

(73) Assignee: Fsas Technologies Inc., Kawasaki (JP)

( * ) Notice: Subject to any disclaimer, the term of this patent is extended or adjusted under 35 U.S.C. 154(b) by 234 days.

(21) Appl. No.: 18/346,448

(22) Filed: Jul. 3, 2023

(65) Prior Publication Data

US 2024/0118838 A1 Apr. 11, 2024

(30) Foreign Application Priority Data

Oct. 6, 2022 (JP) ................................. 2022-161858

(51) Int. Cl.
G06F 3/06 (2006.01)
G06F 9/455 (2018.01)
(52) U.S. Cl.
CPC .......... G06F 3/0664 (2013.01); G06F 3/0604 (2013.01); G06F 3/0683 (2013.01); G06F 9/45558 (2013.01); *G06F 2009/45583* (2013.01)
(58) Field of Classification Search
CPC ..... G06F 3/0664; G06F 3/0604; G06F 3/0683
See application file for complete search history.

(56) References Cited

U.S. PATENT DOCUMENTS

2010/0275201 A1* 10/2010 Lunawat ................. G06F 9/455
718/1
2014/0115579 A1 4/2014 Kong
(Continued)

FOREIGN PATENT DOCUMENTS

JP 2011-145894 7/2011
JP 2015-022385 2/2015

OTHER PUBLICATIONS

Arzuaga et al., Quantifying Load Imbalance on Virtualized Enterprise Servers, 2010, ACM, pp. 235-242 (Year: 2010).*
(Continued)

*Primary Examiner* — Gary W. Cygiel
(74) *Attorney, Agent, or Firm* — ArentFox Schiff LLP

(57) ABSTRACT

A method includes calculating a plurality of first index values indicating access loads from one or more first virtual storage devices accessing a first physical storage device of a plurality of physical storage devices, to the first physical storage device, in a case where access loads from the one or more first virtual storage devices to a plurality of second physical storage devices including the first physical storage device are equalized across the second physical storage devices, the plurality of second physical storage devices being associated with the one or more first virtual storage devices; and outputting a plurality of second index values indicating access loads from a plurality of virtual machines to the first physical storage device, the second index values being obtained by summing the calculated first index values for each virtual machine associated with each of the one or more first virtual storage devices.

12 Claims, 15 Drawing Sheets

(56)  References Cited

U.S. PATENT DOCUMENTS

| 2020/0104151 A1 | 4/2020 | Shibayama et al. |
| 2022/0179555 A1 | 6/2022 | Hogan et al. |

OTHER PUBLICATIONS

Extended European Search Report dated Sep. 21, 2023 for corresponding European Patent Application No. 23183280.9, 9 pages.

\* cited by examiner

| I/O Information for each layer | Availability |
|---|---|
| Information A1 on I/Os from VM to virtual disk | ○ |
| Information A2 on I/Os from virtual disk to physical disk | × |
| Information A3 on I/Os received by physical disk for each virtual disk | × |
| Information A4 on I/Os received by physical disk without distinguishing virtual disks | ○ |

I/O Information between virtual disks and physical disks

One example of first management information

_61

| Virtual disks | Redundancy configuration | Physical disks |
|---|---|---|
| First virtual disk X | Duplexing | A,B |
| First virtual disk Y | RAID 5 | B,C,D,E |
| First virtual disk Z | Duplexing | B,E |

FIG.7

One example of second management information

~62

| Virtual machines | Virtual disks |
|---|---|
| VM#1 | First virtual disk X |
| VM#2 | First virtual disk Y, First virtual disk Z |

When redundancy configuration is mirroring

FIG.12

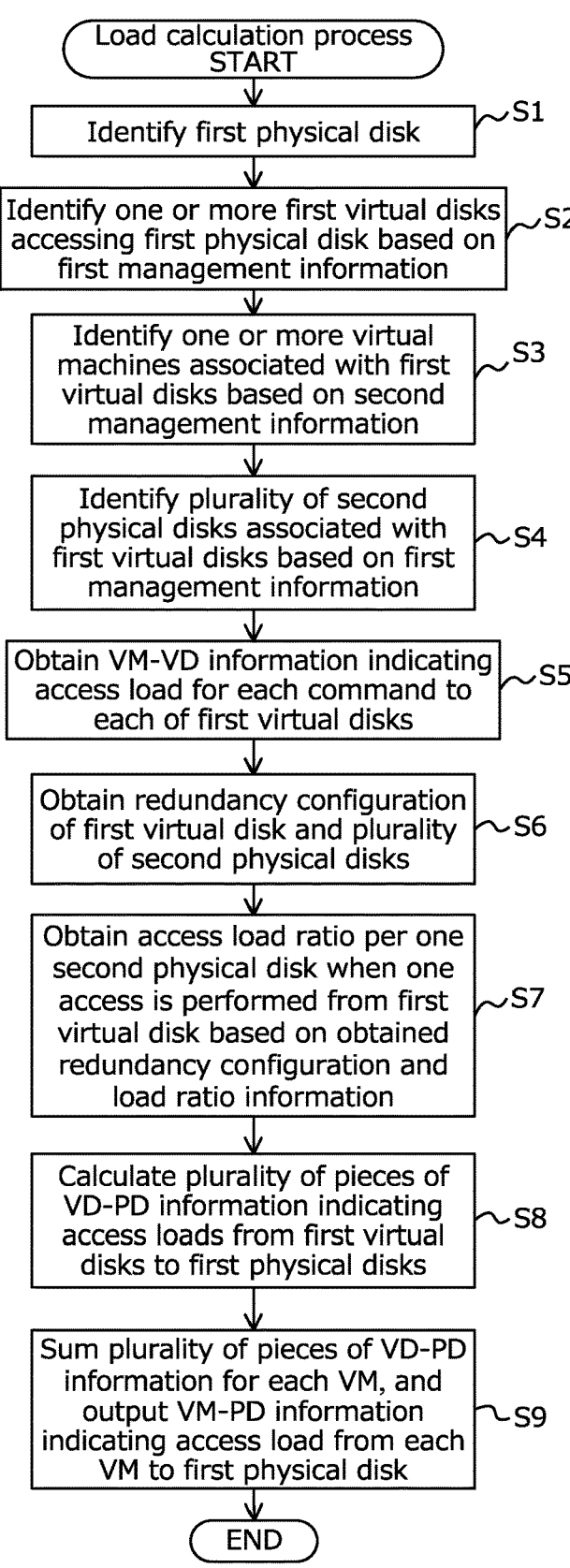

Load calculation process
START

Identify first physical disk ~S1

Identify one or more first virtual disks accessing first physical disk based on first management information ~S2

Identify one or more virtual machines associated with first virtual disks based on second management information ~S3

Identify plurality of second physical disks associated with first virtual disks based on first management information ~S4

Obtain VM-VD information indicating access load for each command to each of first virtual disks ~S5

Obtain redundancy configuration of first virtual disk and plurality of second physical disks ~S6

Obtain access load ratio per one second physical disk when one access is performed from first virtual disk based on obtained redundancy configuration and load ratio information ~S7

Calculate plurality of pieces of VD-PD information indicating access loads from first virtual disks to first physical disks ~S8

Sum plurality of pieces of VD-PD information for each VM, and output VM-PD information indicating access load from each VM to first physical disk ~S9

END

COMPUTER-READABLE RECORDING MEDIUM HAVING STORED THEREIN INFORMATION PROCESSING PROGRAM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent application No. 2022-161858, filed on Oct. 6, 2022, the entire contents of which are incorporated herein by reference.

FIELD

The present disclosure relates to a computer-readable recording medium having stored therein an information processing program, an information processing method, and an information processing apparatus.

BACKGROUND

The technology called "software defined storage (SDS)" has been known which provides storages configured by software using hardware resources of a plurality of servers. The SDS manages physical disks in a plurality of servers as a shared storage, and provides virtual machines running on the plurality of servers with one or more virtual disks allocated from storage areas of the shared storage. The virtual machines (VMs) can access the virtual disks (VDs) without being aware of the physical disks (PDs) on which actual data is stored.

For example, related arts are disclosed in Japanese Laid-open Patent Publication No. 2011-145894 and Japanese Laid-open Patent Publication No. 2015-022385.

SUMMARY

According to an aspect of the embodiments, a non-transitory computer-readable recording medium having stored therein an information processing program that causes a computer to execute a process. The process may include calculating a plurality of first index values indicating access loads from one or more first virtual storage devices accessing a first physical storage device of a plurality of physical storage devices, to the first physical storage device, in a case where access loads from the one or more first virtual storage devices to a plurality of second physical storage devices including the first physical storage device are equalized across the plurality of second physical storage devices, the plurality of second physical storage devices being associated with the one or more first virtual storage devices. The process may include outputting a plurality of second index values indicating access loads from a plurality of virtual machines to the first physical storage device, the plurality of second index values being obtained by summing the calculated plurality of first index values for each virtual machine associated with each of the one or more first virtual storage devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a configuration of a system according to one embodiment;

FIG. 2 is a diagram illustrating an example focusing on access loads from VMs to a physical disk in the system illustrated in FIG. 1;

FIG. 3 is a diagram illustrating the availabilities of information on I/Os in the system illustrated in FIG. 1;

FIG. 5 is a diagram illustrating an example of an operation of the load calculating unit according to one embodiment;

FIG. 6 is a diagram illustrating one example of first management information according to one embodiment;

FIG. 7 is a diagram illustrating one example of second management information according to one embodiment;

FIG. 12 is a flowchart illustrating an example of an operation in a load calculation process by the load calculating unit according to one embodiment;

DESCRIPTION OF EMBODIMENT(S)

Figure 4:
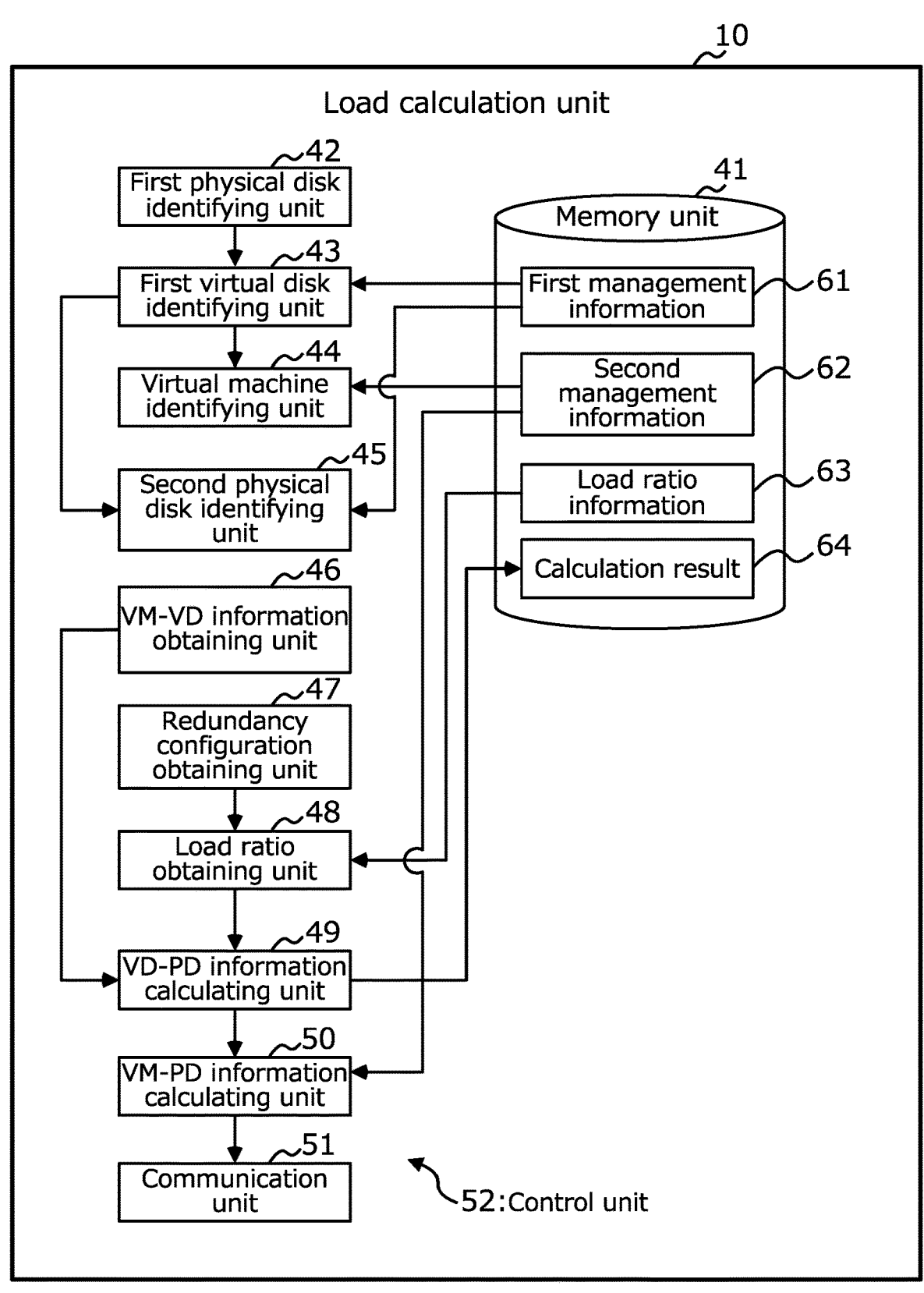
FIG. 4 is a block diagram illustrating an example of a functional configuration of a load calculating unit according to one embodiment.

If the access (e.g., input/output (I/O)) load on a virtual disk by a certain virtual machine causes an increase in the access load on a certain physical disk, the access performances of other virtual machines using that physical disk may be decreased. Therefore, the virtual machine responsible for the increase in the load on the physical disk is identified and the usage state of the identified virtual machine is reviewed, so that the access performances of other virtual machines would be prevented from decreasing.

However, in the SDS, although access information from a virtual machine to a virtual disk and access information received by a physical disk (without distinguishing virtual disks) are available, obtaining access information from a virtual disk to a physical disk may be difficult, for example. This makes it difficult to identify the virtual machine responsible for an increase in the load on a certain physical disk from information managed by the SDS.

In addition, if an attempt is made to obtain access information from a virtual disk to a physical disk, the amount of information managed by the SDS increases, which would consume the storage areas and increase the processing load (overhead) for obtaining such access information. In other words, for obtaining access information from a virtual disk to a physical disk, a large amount of resources of the SDS would be consumed.

Hereinafter, an embodiment of the present disclosure will be described with reference to the drawings. Note that the embodiment that will be described below is merely exemplary, and it is not intended to exclude various variations and applications of techniques that are not explicitly described below. For example, the present embodiment may be modified in various forms without departing from the scope thereof. In the drawings used in the following description, elements denoted by the like reference symbols denote the same or similar elements unless otherwise stated.

(A) Description of One Example of System

Figure 1:
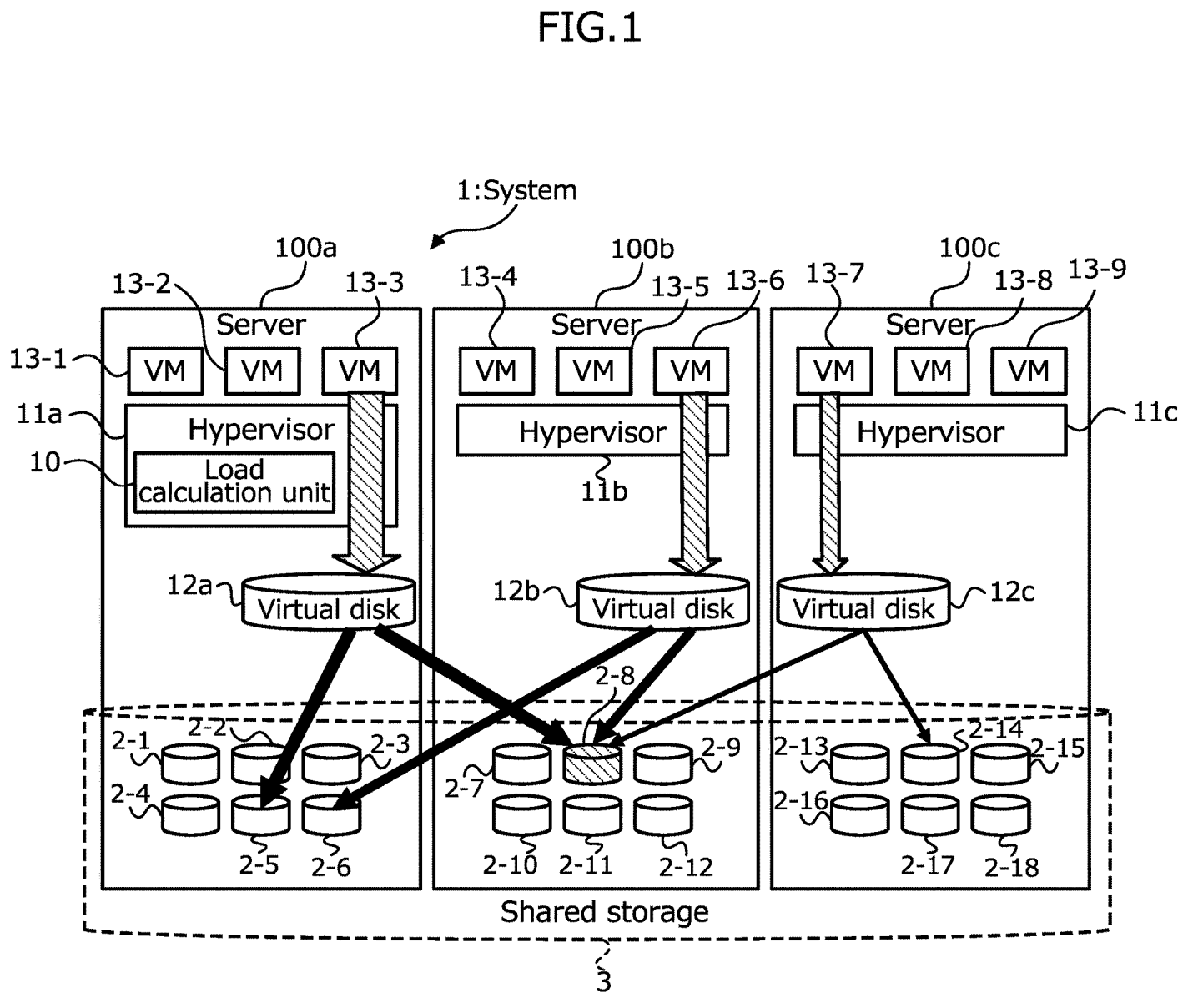

FIG. 1 is a diagram illustrating an example of a configuration of a system 1 according to an embodiment.

The system 1 is a computer system including a plurality of servers 100a, 100b, and 100c (sometimes collectively referred to as servers 100). The system 1 may, in one example, implement virtualization infrastructures, such as the computing function, the networking function, and the storage function, using hardware of the servers 100. The system 1 may be implemented, by way of example, using a technology such as the hyper-converged infrastructure (HCI). The system 1 may also function as a storage system using a technology such as the SDS, for example.

Each of the plurality of servers 100 is a physical server and is one example of a computer. The server 100a includes a plurality of physical disks 2-1 to 2-6, the server 100b includes a plurality of physical disks 2-7 to 2-12, and the server 100c includes a plurality of physical disks 2-13 to 2-18. The plurality of physical disks 2-1 to 2-18 (sometimes collectively referred to as physical disks 2) may be internal storages of the servers 100.

The physical disks 2 are examples of physical storage devices. Examples of the physical disks 2 include various types of storage devices, including magnetic storage devices such as hard disk drives (HDDs), and semiconductor storage devices such as solid state drives (SSDs), for example.

The plurality of physical disks 2 may be managed so as to be accessible from the plurality of servers 100. In other words, the plurality of physical disks 2 may be used as a virtual shared storage 3. As one example, the server 100a can access the physical disks 2-7 to 2-18 provided inside different servers 100b and 100c.

The plurality of servers 100 may execute respective hypervisors 11a, 11b, and 11c (sometimes collectively referred to as hypervisor(s) 11). The hypervisors 11 are software that implements a virtualized environment using various resources, such as computing resources and storage resources of the servers 100. For example, the hypervisors 11a, 11b, and 11c may cooperate with each other through communications among the servers 100 to implement a virtualized environment using various resources of the servers 100a, 100b, and 100c. In the following description, it is assumed that controls by a hypervisor 11 are executed by at least one of the hypervisors 11a, 11b, and 11c.

The hypervisors 11 execute virtual machines (VMs) 13-1 to 13-9 (sometimes collectively referred to as VMs 13) on the servers 100. For example, the hypervisors 11 allocate a resource such as a processor, a memory, or a storage of the server 100 to each VM 13, so that the each VM 13 runs independently of other VMs 13.

In the example in FIG. 1, a plurality of VMs 13-1 to 13-3, VMs 13-4 to 13-6, and VMs 13-7 to 13-9 are executed on the servers 100a, 100b, and 100c, respectively. However, the number of VMs 13 is not limited to this example. Each VM 13 may run software, such as an operating system (OS) and applications using resources allocated by the hypervisor 11.

The hypervisors 11 allocate a part of storage areas of the shared storage 3 to one or more virtual disks 12a, 12b, and 12c (sometimes collectively referred to as virtual disks 12). The hypervisors 11 also allocate one or more virtual disks 12 to their corresponding VMs 13. Each VM 13 accesses one or more virtual disks 12 associated with that VM 13 without being aware of physical disk 2 on which data is actually stored. In response to an access from a VM 13 to a virtual disk 12, the hypervisor 11 controls an access to the physical disk 2 associated with that virtual disk 12. In this manner, each VM 13 can access the physical disks 2 via the virtual disks 12.

In the example in FIG. 1, the VM 13-3 accesses the physical disks 2-5 and 2-8 via the virtual disk 12a. The VM 13-6 accesses the physical disks 2-6 and 2-8 via the virtual disk 12b. The VM 13-7 accesses the physical disks 2-8 and 2-14 via the virtual disk 12c.

The system 1 according to one embodiment also includes a load calculating unit 10 that calculates (estimates) the access load on a physical disk 2 which is a load calculation target, for each VM 13 that accesses the physical disk 2.

Although the load calculating unit 10 is provided in one hypervisor 11a of the plurality of hypervisors 11a to 11c in one embodiment, this is not limiting. For example, the load calculating unit 10 may be provided in the hypervisor 11b or 11c or may be provided in any two or more of the hypervisors 11a to 11c, or may be provided in at least one VM 13. Alternatively, the load calculating unit 10 may be provided in a load calculation server different from the servers 100. The server 100 that implements the functions of the load calculating unit 10 or the load calculation server is one example of an information processing apparatus or a computer.

Figure 2:
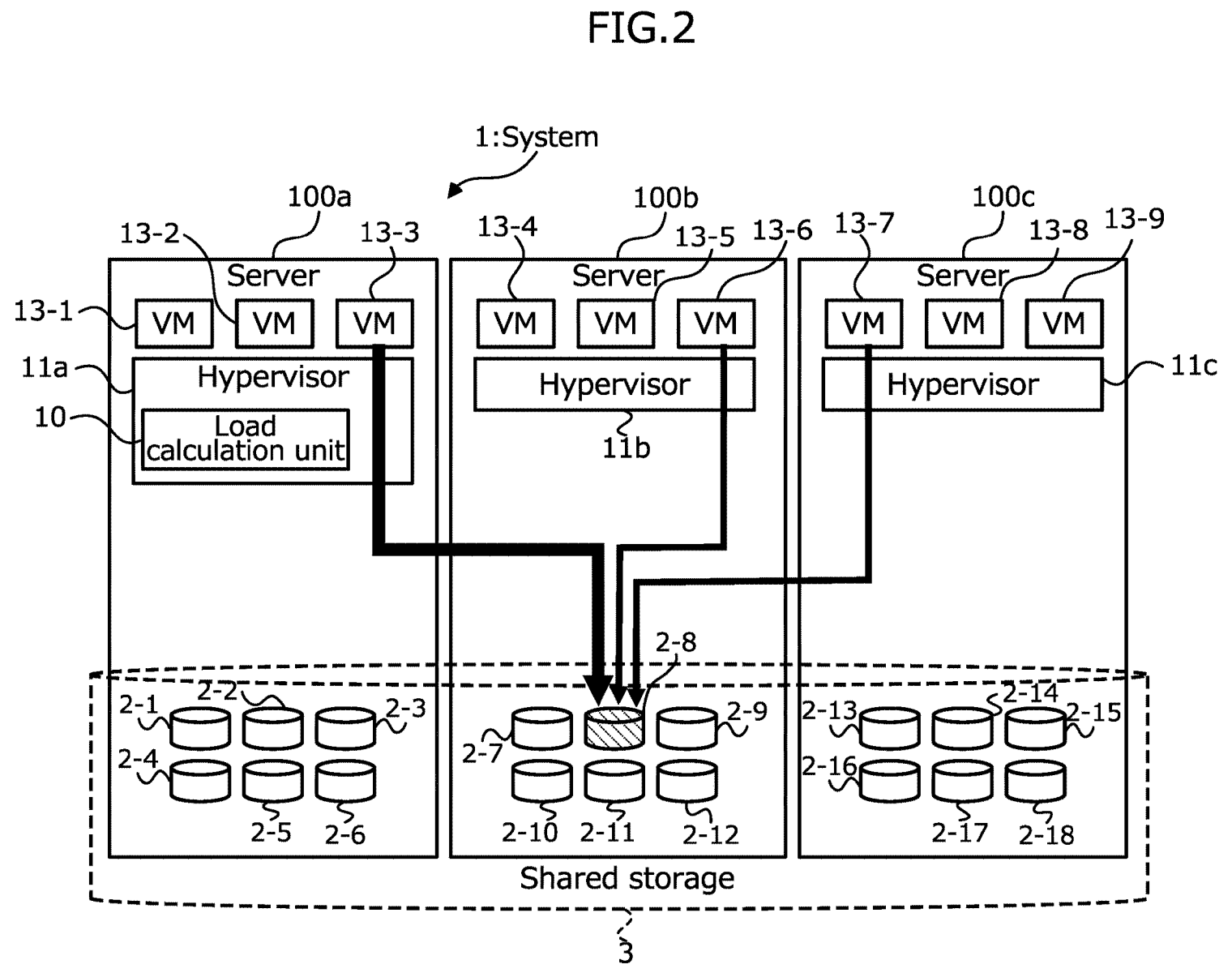

FIG. 2 is a diagram illustrating an example focusing on the access loads from the VMs 13 to a physical disk 2 in the system 1 illustrated in FIG. 1. As exemplified in FIG. 2, accesses from the VMs 13-3, 13-6, and 13-7 are concentrated on a specific physical disk 2-8. For example, if the access load from the VM 13-3 to the physical disk 2-8 increases, the access performances of both of the VMs 13-6 and 13-7 using that physical disk 2-8 may be affected.

Therefore, it would be desirable to identify the VM 13 (e.g., the VM 13-3) responsible for the increase in the load on the physical disk 2-8 and review the usage state of the identified VM 13-3, so that I/O performances of the other VMs 13 (e.g., the VMs 13-6 and 13-7) are prevented from decreasing.

FIG. 3 is a diagram illustrating availabilities of information on I/Os in the system 1 illustrated in FIG. 1. The information on I/Os is one example of an access load index value, and may be, for example, information on various I/O performances such as the I/O per second (IOPS) or the throughput. The IOPS is the number of I/Os per unit time (1 second).

The system 1 can obtain, by the hypervisors 11 or the VMs 13, for example, information A1 on I/Os from each VM 13 to each virtual disk 12, and information A4 on I/Os received by each physical disk 2 without distinguishing virtual disks 12 from which accesses are originated.

However, it may be difficult for the system 1 to obtain information on I/Os between the virtual disks 12 and the physical disks 2. In the example in FIG. 3, the system 1 obtains neither information A2 on I/Os from each of the virtual disks 12*a*, 12*b*, and 12*c* to the physical disks 2-1 to 2-18, nor information A3 on I/Os received by each of the physical disks 2-1 to 2-18 for each of the virtual disks 12*a*, 12*b*, and 12*c*.

If the system 1 would attempt to obtain information A2 and A3 to identify the VM 13 responsible for the increase in the access load on the physical disk 2-8, the amount of information managed by the SDS would increase and the processing load for obtaining the information A2 and A3 would also increase. In other words, a large amount of resources of the system 1 would be consumed.

To address this issue, the load calculating unit 10 according to one embodiment executes a load calculation process to identify a VM 13 responsible for an increase in the load on a specific physical disk 2 (e.g., 2-8) while preventing an increase in consumption of the resources of the system 1.

(B) Example of Functional Configuration

FIG. 4 is a block diagram illustrating an example of the functional configuration of the load calculating unit 10 according to one embodiment. The load calculating unit 10 is one example of a computer.

As illustrated in FIG. 4, the load calculating unit 10 may include, byway of example, a memory unit 41, a first physical disk identifying unit 42, a first virtual disk identifying unit 43, a virtual machine identifying unit 44, and a second physical disk identifying unit 45. The load calculating unit 10 may also include a VM-VD information obtaining unit 46, a redundancy configuration obtaining unit 47, a load ratio obtaining unit 48, a VD-PD information calculating unit 49, a VM-PD information calculating unit 50, and a communication unit 51. These blocks 42 to 51 are examples of a control unit 52.

The memory unit 41 is one example of a storage area and stores various types of data used by the load calculating unit 10. The memory unit 41 may be implemented, for example, by storage areas possessed by either or both of a memory 40*b* and a storage unit 40*c* illustrated in FIG. 15 to be described later.

As illustrated in FIG. 4, the memory unit 41 may store, by way of example, first management information 61, second management information 62, and load ratio information 63. The memory unit 41 may store a calculation result 64. In the following description, these pieces of information 61 to 64 are described below in table formats, but this is not limiting. For example, at least one piece of the information 61 to 64 stored in the memory unit 41 may be in any of various formats, such as a database (DB) or arrays.

Figure 5:
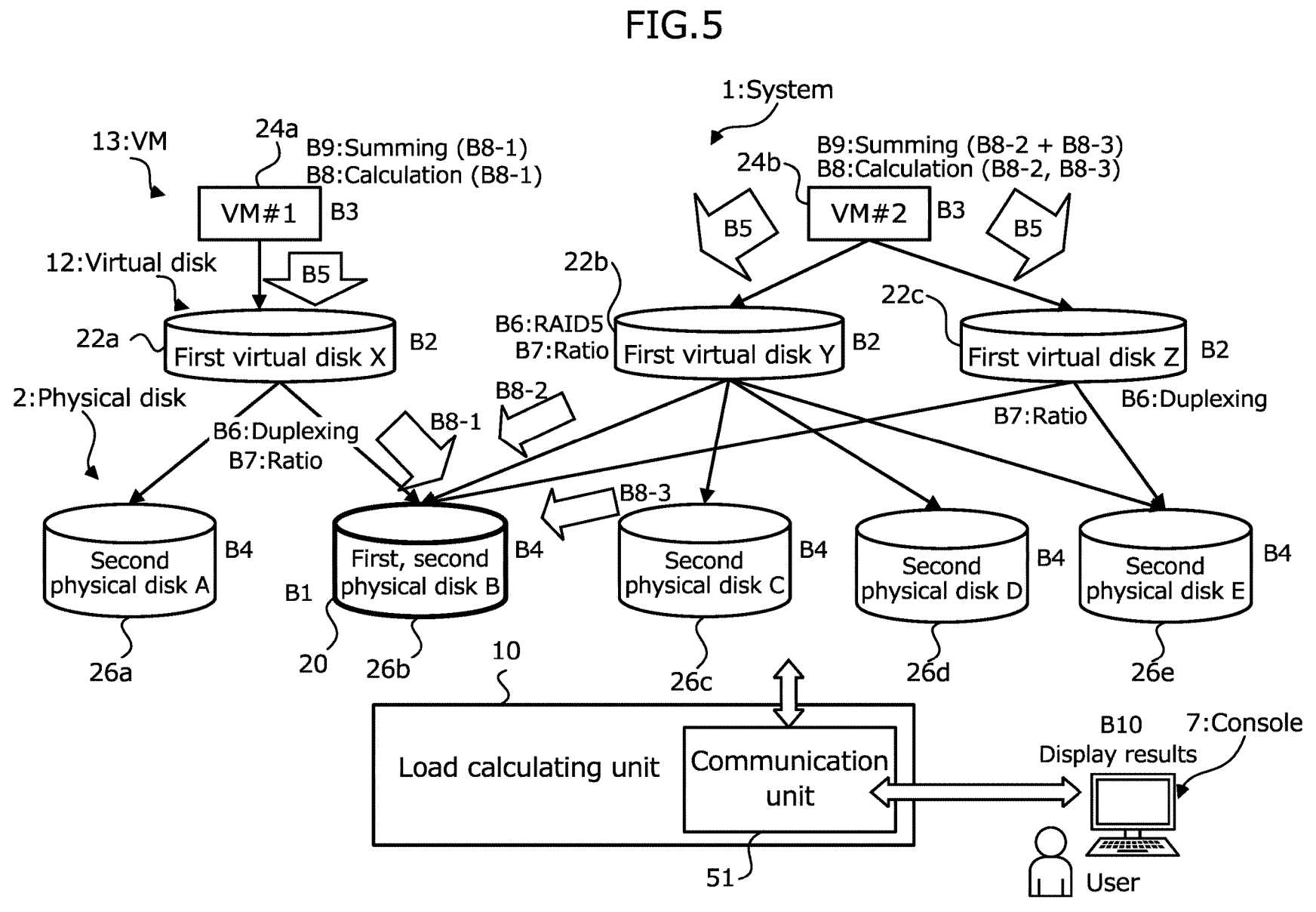

An example of an operation of the load calculating unit 10 will be described with reference to FIGS. 5 to 11. FIG. 5 is a diagram illustrating an example of an operation of the load calculating unit 10 according to one embodiment. Hereinafter, one example of the process of each block 42 to 51 in the load calculating unit 10 will be described along the flow of processes B1 to B10 illustrated in FIG. 5.
(Process B1)

As exemplified by the process B1 in FIG. 5, the first physical disk identifying unit 42 identifies a first physical disk 20 from a plurality of physical disks 2. The first physical disk 20 is one example of a first physical storage device.

For example, the first physical disk identifying unit 42 may identify, from the plurality of physical disks 2, a physical disk B (see FIG. 5) of which access load is equal to or greater than a threshold as the first physical disk 20. As one example, the first physical disk identifying unit 42 may determine whether or not the access load on each physical disk 2 is equal to or greater than the threshold based on the information A4 on I/Os illustrated in FIG. 3.

Alternatively, the first physical disk identifying unit 42 may identify, from the plurality of physical disks 2, a physical disk 2 indicated in a selection that has received, as the first physical disk 20. For example, the first physical disk identifying unit 42 may identify the first physical disk 20 based on a selection instruction received from a user via a communication unit 51 to be described later.

When a plurality of first physical disks 20 are identified, the load calculating unit 10 may execute the later-described process on each of the identified first physical disks 20.
(Process B2)

The first virtual disk identifying unit 43 identifies, from a plurality of virtual disks 12, one or more first virtual disks 22*a* to 22*c* accessing the first physical disk 20 based on the first management information 61. The first virtual disk 22 is one example of a first virtual storage device.

FIG. 6 is a diagram illustrating one example of the first management information 61 according to one embodiment. The first management information 61 is one example of first management information indicating the associational relationship between the plurality of physical disks 2 and the plurality of virtual disks 12. The first management information 61 may be stored in the memory unit 41 in advance as management information used by the system 1 (the hypervisors 11), or may be obtained by the load calculating unit 10 from the hypervisors 11 or the like and stored in the memory unit 41.

The first management information 61 illustrated in FIG. 6 may include, by way of example, items of "Virtual disks", "Redundancy configuration", and "physical disks". The item "Virtual disks" indicates virtual disks 12 managed by the system 1. The item "physical disks" indicates physical disks 2 associated with each virtual disk 12. The item "Redundancy configuration" indicates the redundancy configuration of each virtual disk 12 configured by the plurality of physical disks 2.

As one example, the first entry in the first management information 61 indicates that the configuration of a first virtual disk X is duplexing by a plurality of physical disks A and B. As another example, the second entry in the first management information 61 indicates that the configuration of a first virtual disk Y is redundant array of independent disk (RAID) 5 by a plurality of physical disks B, C, D, and E.

For example, the first virtual disk identifying unit 43 looks up the first management information 61 and identifies the first virtual disks X, Y, and Z of which entries of "physical disks" indicate the physical disk B, as the first virtual disks 22.
(Process B3)

Based on the second management information 62, the virtual machine identifying unit 44 identifies, from a plurality of VMs 13, one or more VMs 24 allocated to each of the one or more first virtual disks 22*a* to 22*c*.

FIG. 7 is a diagram illustrating one example of the second management information 62 according to one embodiment.

The second management information 62 is one example of second management information indicating the associational relationship between the plurality of VMs 13 and the plurality of virtual disks 12. The second management information 62 may be stored in the memory unit 41 in advance as management information used by the system 1 (the hypervisors 11), or may be obtained by the load calculating unit 10 from the hypervisors 11 or the like and stored in the memory unit 41.

The second management information 62 illustrated in FIG. 7 indicates that a VM #1 is associated with the first virtual disk X and a VM #2 is associated with the first virtual disks Y and Z.

The virtual machine identifying unit 44 looks up the second management information 62, and identifies the VM 24a (VM #1) allocated to the first virtual disk X and the VM 24b (VM #2) allocated to each of the first virtual disks Y and Z.

(Process B4)

The second physical disk identifying unit 45 identifies second physical disks 26a to 26e (A to E) from the plurality of physical disks 2. The second physical disks 26a to 26e are a plurality of physical disks 2 associated with the one or more first virtual disks 22a to 22c (X to Z) identified in the process B2. Note that the second physical disks 26a to 26e include the first physical disk 20.

For example, the second physical disk identifying unit 45 looks up the first management information 61 and identifies each of the second physical disks A and B associated with the first virtual disk X. The second physical disk identifying unit 45 also identifies each of the second physical disks B, C, D, and E associated with the first virtual disk Y. The second physical disk identifying unit 45 further identifies each of the second physical disks B and E associated with the first virtual disk Z.

(Process B5)

The VM-VD information obtaining unit 46 obtains VM-VD information. The VM-VD information is an index value indicating the access load from each of the one or more VMs 24a (VM #1) and VMs 24b (VM #2) identified in the process B3 to the first virtual disks 22a to 22c, and is one example of a third index value. For example, the VM-VD information may information on I/Os (IOPS, as one example) for each of write and read commands from each of the VMs 24a and 24b to the first virtual disks 22a to 22c.

For example, the VM-VD information obtaining unit 46 may obtain the VM-VD information for each of the first virtual disks 22a to 22c based on the information A1 on I/Os (see FIG. 3) possessed by the system 1 (hypervisor 11 or VM 13).

(Process B6)

The redundancy configuration obtaining unit 47 obtains the redundancy configuration of the plurality of second physical disks 26a to 26e associated with the first virtual disks 22a to 22c. For example, the redundancy configuration obtaining unit 47 may look up the first management information 61 (FIG. 5) and obtain the redundancy configuration.

In one example, as illustrated in FIGS. 5 and 6, the first virtual disk 22a has a redundancy configuration of duplexing by the second physical disks 26a and 26b, and the first virtual disk 22b has a redundancy configuration of RAID 5 by the second physical disks 26b to 26e. The first virtual disk 22c has a redundancy configuration of duplexing by the second physical disks 26b and 26e.

(Process B7)

The load ratio obtaining unit 48 obtains load ratio information 63. The load ratio information 63 is one example of a third index value indicating the access load for each command from the first virtual disk 22 to the plurality of second physical disks 26 associated with that first virtual disk 22.

For example, the load ratio information 63 may indicate the I/O load (e.g., number of commands processed) per one second physical disk 26 when one access is executed (when a command is issued) from the first virtual disk 22 to the plurality of second physical disks 26. Note that the load ratio information 63 may include the access load ratios in the plurality of second physical disks 26, for each of write or read commands and for each redundancy configuration.

The access load ratio is information indicating, for each command and for each redundancy configuration, the ratio of accesses (e.g., the number of commands processed) in each of the plurality of second physical disks 26 in response to a single command issued from the first virtual disk 22.

Figure 8:
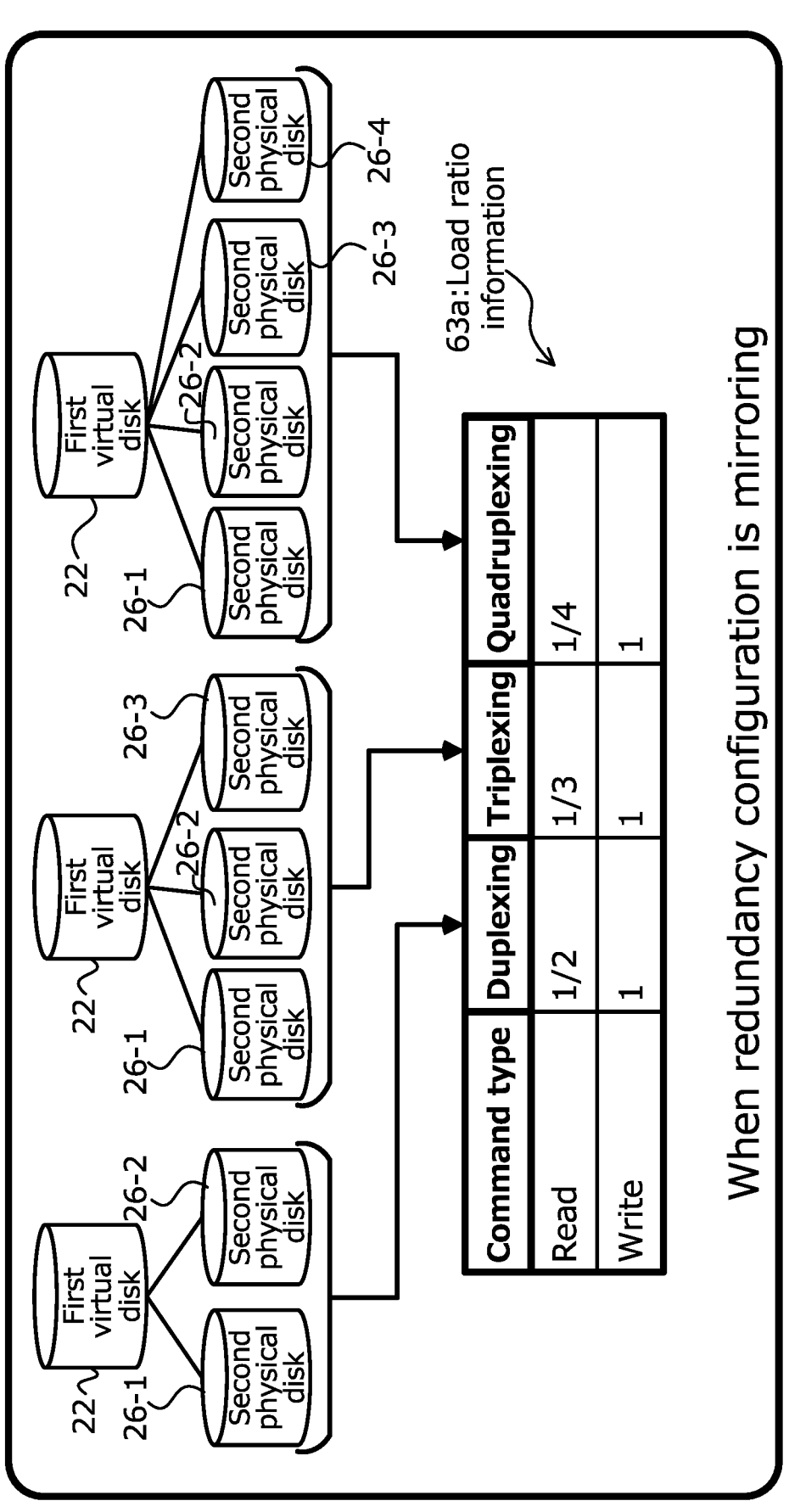
FIG. 8 is a diagram illustrating one example of load ratio information according to one embodiment.

FIG. 8 is a diagram illustrating one example of load ratio information 63 according to one embodiment. FIG. 8 illustrates one example of the load ratio information 63a in the case where mirroring is employed as the redundancy configuration.

Mirroring improves the reliability by storing the same data on a plurality of n-way multiplexed physical disks 26 (n is an integer of 2 or more). FIG. 8 illustrates one example of duplexing by two second physical disks 26-1 and 26-2, triplexing by three second physical disks 26-1, 26-2, and 26-3, and quadruplexing by four second physical disks 26-1, 26-2, 26-3, and 26-4.

In the case of duplexing, a write command from the first virtual disk 22 toward the second physical disks 26 is executed by both the second physical disks 26-1 and 26-2, in other words, the number of command processing per one second physical disk 26 is "1". In other words, the access load ratio in this case is "1".

In addition, in the case of duplexing, a read command from the first virtual disk 22 toward the second physical disks 26 is executed by any one of the second physical disks 26-1 and 26-2, in other words, the number of command processing per one second physical disk 26 is "½". In other words, the access load ratio in this case is "½".

Also in the cases of triplexing and quadruplexing, the number of commands processed by one second physical disk 26 in response to one write command (access load ratio) is "1" because all of the second physical disks 26 process the command.

On the other hand, in the case of triplexing, a read command from the first virtual disk 22 toward the second physical disks 26 is executed by any one of the second physical disks 26-1 to 26-3. In other words, the number of command processing per one second physical disk 26 (access load ratio) in this case is "⅓".

In addition, in the case of quadruplexing, a read command from the first virtual disk 22 toward the second physical disks 26 is executed by any one of the second physical disks 26-1 to 26-4. In other words, the number of command processing per one second physical disk 26 (access load ratio) in this case is "¼".

In FIG. 8, the examples of the load ratio information 63a are exemplified in cases of n-way multiplexing where n is 2 to 4, but this is not limiting. The load ratio information 63a may include the access load ratios when n is 5 or more.

Figure 9:
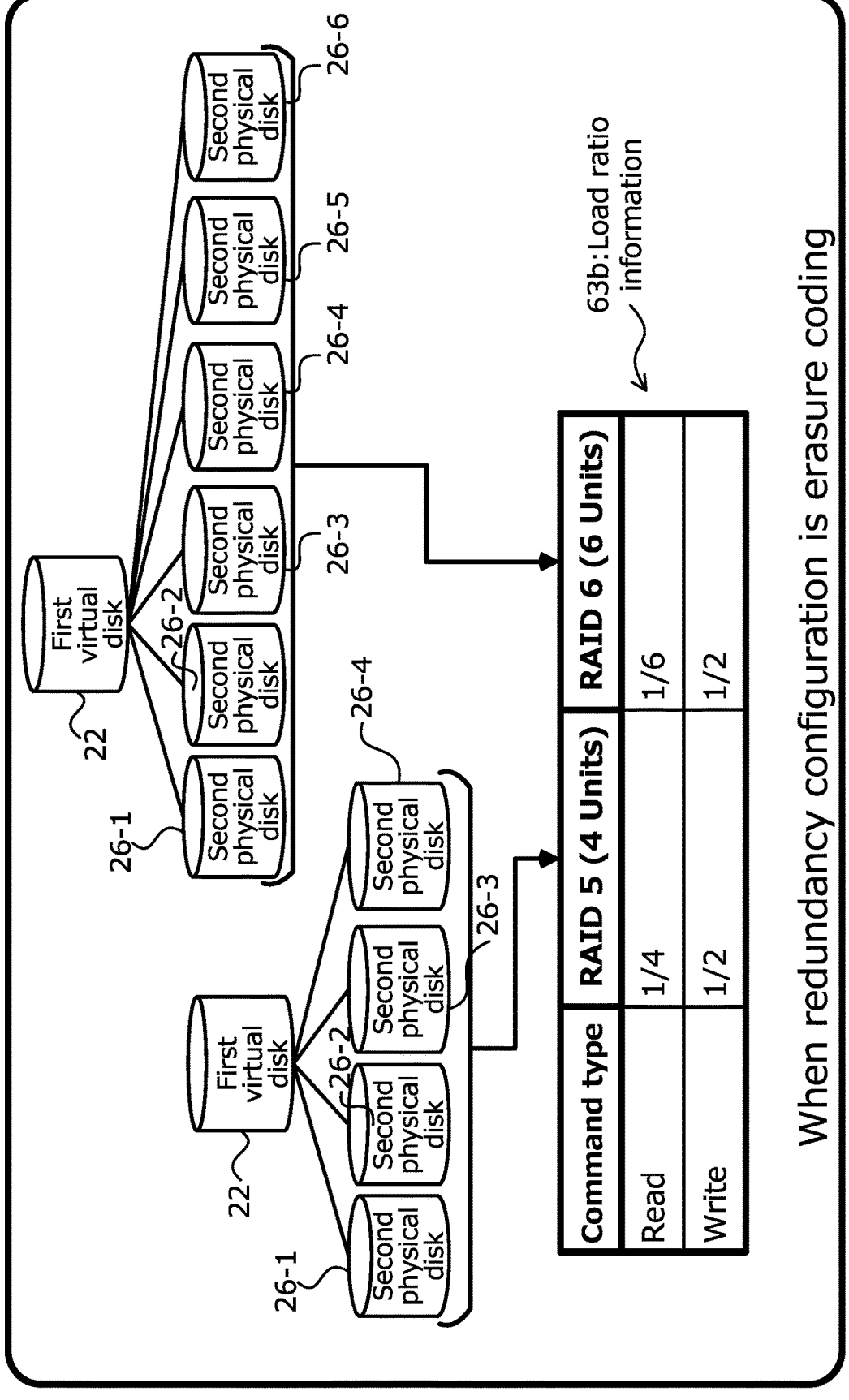
FIG. 9 is a diagram illustrating one example of load ratio information according to one embodiment.

FIG. 9 is a diagram illustrating one example of load ratio information 63b according to one embodiment. FIG. 9 illustrates one example of the load ratio information 63b in the case where erasure coding is employed as the redundancy configuration.

In erasure coding, data is divided and distributedly stored across the plurality of second physical disks 26. In erasure coding, a redundancy code called parity data is also stored in at least one of the plurality of second physical disks 26. The parity data is used in case of missing data, etc. on a particular physical disk 26 (e.g., the physical disk 26-1) for restoring the missing data based on information stored on the other physical disks 26 (e.g., physical disks 26-2 to 26-4).

According to one embodiment, among various techniques of erasure coding, RAID 5 and RAID 6 which employ the distributed parity method will be described as examples.

In RAID 5, N (N is an integer of 3 or more) second physical disks 26 are used. In the example in FIG. 9, data and parity data are distributedly stored across four second physical disks 26-1 to 26-4 that are associated with one first virtual disk 22. In RAID 5 by N second physical disks 26, data is distributedly stored in N−1 second physical disks 26 and parity data for the data is stored in one second physical disk 26.

In the case of RAID 5 (four units), a write command from the first virtual disk 22 toward the second physical disks 26 is executed by any two of the second physical disks 26-1 to 26-4. This is because one second physical disk 26 writes data per se in the storage area thereof and one second physical disk 26 writes parity data of the data in the storage area thereof. In other words, the number of command processing per one second physical disk 26 (access load ratio) in this case is "½".

Further, in the case of RAID 5 (four units), a read command from the first virtual disk 22 toward the second physical disk 26 is executed by one of the second physical disks 26-1 to 26-4. This is because the data to be read pertaining to the read command has been written to one of the plurality of second physical disks 26. In other words, the number of command processing per one second physical disk 26 (access load ratio) in this case is "¼".

In RAID 6, M (M is an integer of 4 or more) second physical disks 26 are used. In the example in FIG. 9, data and parity data are distributedly stored across six second physical disks 26-1 to 26-6 that are associated with one first virtual disk 22. In RAID 6 by M second physical disks 26, data is distributedly stored in M−2 second physical disks 26, and parity data for the data is stored in two second physical disks 26.

In the case of RAID 6 (six units), a write command from the first virtual disk 22 toward the second physical disks 26 is executed by any three of the second physical disks 26-1 to 26-6. This is because one second physical disk 26 writes data per se in the storage area thereof, and two second physical disks 26 write parity data of the data in the storage areas thereof. In other words, the number of command processing per one second physical disk 26 (access load ratio) in this case is "½".

Further, in the case of RAID 6 (six units), a read command from the first virtual disk 22 toward the second physical disks 26 is executed by one of the second physical disks 26-1 to 26-6. This is because the data to be read pertaining to the read command has been written to one of the plurality of second physical disks 26. In other words, the number of command processing per one second physical disk 26 (access load ratio) in this case is "⅙".

FIG. 9 exemplifies the load ratio information 63*b* in the cases of erasure coding with RAID 5 (N=4) and RAID 6 (M=6), but this is not limiting. The load ratio information 63*b* may include access load ratios in cases of various redundancy configurations, such as RAID 5 where N is 3 or 5 or greater, RAID 6 where M is 4, 5, or 7 or greater, or other erasure coding configurations.

The load ratio information 63 described above may be calculated in the system 1 and stored in the memory unit 41 in advance. In addition, when the associational relationship between the virtual disks 12 and the physical disks 2 or the redundancy configuration is added or updated, the load ratio information 63 may be updated based on the added or updated configuration.

(Process B8)

The VD-PD information calculating unit 49 calculates a plurality of pieces of VD-PD information B8-1 to B8-3 (see FIG. 5) indicating access loads from the one or more first virtual disks 22*a* to 22*c* to the first physical disk 20 (e.g., 26*b*). The VD-PD information B8-1 to B8-3 is one example of a plurality of first index values indicating access loads to the first physical disk 20 in the case where the access loads from the first virtual disk 22 (e.g., 22*a*) to the second physical disks 26 (e.g., 26*a*, 26*b*) are equalized. The expression "access loads are equalized" may mean, for example, that the access loads are the same (are equal) or are approximately the same across the second physical disks 26 including errors etc.

In the example in FIG. 5, VD-PD information B8-1 of the first virtual disk 22*a* indicates the access load to the first physical disk 20 in the case where the access loads from the first virtual disk 22*a* to the second physical disks 26*a* and 26*b* are equalized.

For example, the VD-PD information calculating unit 49 calculates the VD-PD information B8-1 on the first virtual disk 22*a* based on the load ratio information (see process B7) according to the redundancy configuration of the second physical disks 26*a* and 26*b* obtained in the process B6 and the VM-VD information (see process B5).

The VD-PD information calculating unit 49 also calculates the VD-PD information B8-2 on the first virtual disk 22*b* based on the load ratio information (see process B7) according to the redundancy configuration of the second physical disks 26*b* to 26*e* and the VM-VD information (see process B5).

The VD-PD information calculating unit 49 further calculates the VD-PD information B8-3 on the first virtual disk 22*c* based on the load ratio information (see process B7) according to the redundancy configuration of the second physical disks 26*b* and 26*e* and the VM-VD information (see process B5).

Figure 10:
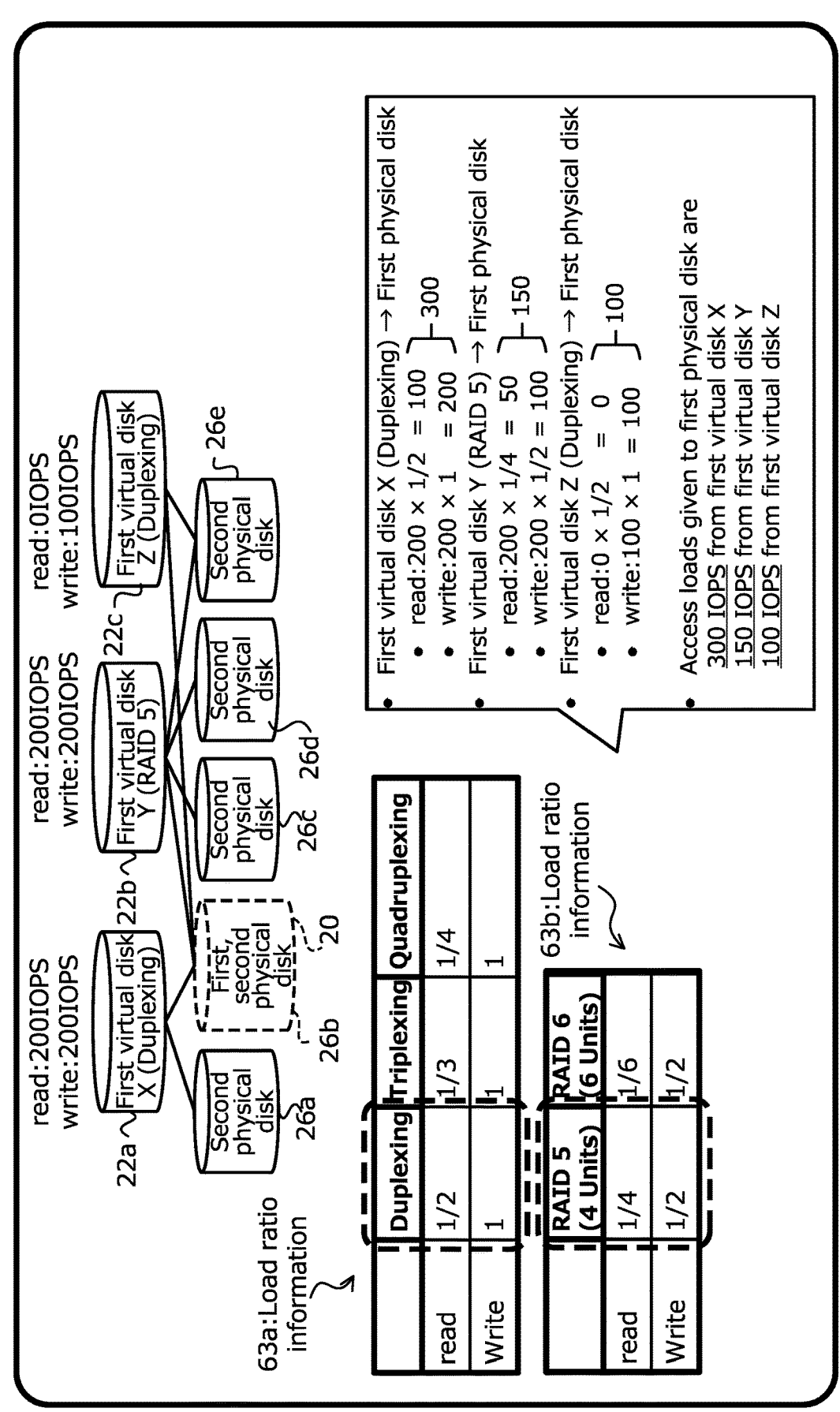
FIG. 10 is a diagram illustrating an example of a calculation of the access load from each of the first virtual disks to the first physical disk.

FIG. 10 is a diagram illustrating an example of a calculation of the access load from each of the first virtual disks 22*a* to 22*c* to the first physical disk 20.

In FIG. 10, the VM-VD information on the first virtual disks 22*a* and 22*b* indicates the case where the access loads of write commands are 200 IOPS and the access loads of read commands are 200 IOPS. Further, the VM-VD information of the first virtual disk 22*c* indicates the case where the access load of write commands is 100 IOPS and the access load of read commands is 0 IOPS.

Because each VM-VD information varies, the VM-VD information obtaining unit 46 may obtain VM-VD information as appropriate in the process B5 every time the load calculation process is executed. Note that information other than IOPS may be used as VM-VD information.

For the first virtual disk 22*a* (X), the VD-PD information calculating unit 49 calculates the access load for each command based on the load ratio information 63*a* (duplexing). In the example in FIG. 10, the VD-PD information calculating unit 49 calculates the access load of the read commands from the first virtual disk X (200 IOPS×½=100)

and the access load of the write commands to the first virtual disk X (200 IOPS×1=200). Then, the VD-PD information calculating unit 49 sums the access loads for each command and calculates the VD-PD information B8-1 of the first virtual disk X to be 300 IOPS.

For the first virtual disk 22*b* (Y), the VD-PD information calculating unit 49 calculates the access load for each command based on the load ratio information 63*b* (RAID 5 (four units)). In the example in FIG. 10, the VD-PD information calculating unit 49 calculates the access load of the read commands from the first virtual disk Y (200 IOPS× ¼=50) and the access load of the write commands to the first virtual disk Y (200 IOPS×½=100). Then, the VD-PD information calculating unit 49 sums the access loads for each command and calculates the VD-PD information B8-2 of the first virtual disk Y to be 150 IOPS.

Similarly, for the first virtual disk 22*c* (Z), the VD-PD information calculating unit 49 calculates the access load of the read commands from the first virtual disk Z (0 IOPS× ½=0) and the access load of the write commands to the first virtual disk Z (200 IOPS×½=100). Then, the VD-PD information calculating unit 49 sums the access loads for each command and calculates the VD-PD information B8-3 of the first virtual disk Z to be 100 IOPS.

As described the above, the access loads (I/O loads) of 300 IOPS, 150 IOPS, and 100 IOPS are estimated to be given from the first virtual disks 22*a* to 22*c*, respectively, to the first physical disk 20.
(Process B9)

The VM-PD information calculating unit 50 calculates a plurality of pieces of VM-PD information indicating the access load from the plurality of VMs 24*a* and 24*b* to the first physical disk 20. The VM-PD information is one example of a second index value.

For example, the VM-PD information calculating unit 50 calculates a plurality of pieces of VM-PD information by summing the VD-PD information B8-1 to B8-3 calculated by the VD-PD information calculating unit 49, for each of the VMs 24*a* and 24*b* allocated to the one or more first virtual disks 22*a* to 22*c*.

Figure 11:
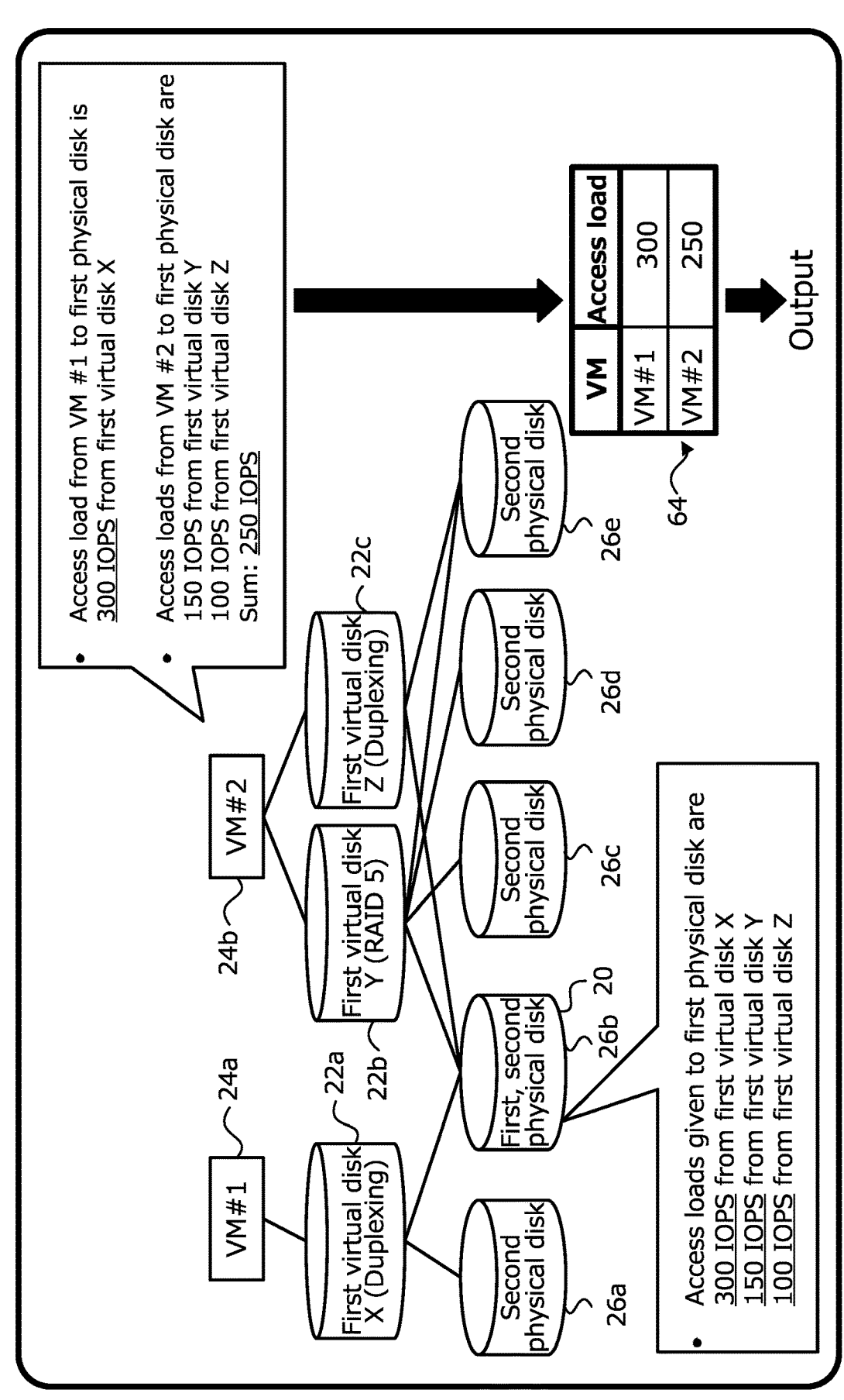
FIG. 11 is a diagram illustrating an example of a calculation of the access loads from virtual machines to a first physical disk.

FIG. 11 is a diagram illustrating an example of a calculation of the access load from VMs 24*a* and 24*b* to the first physical disk 20.

The VM-PD information calculating unit 50 may look up the second management information 62 and identify the first virtual disk 22*a* (X) as being associated with the VM 24*a* (#1). Alternatively, the VM-PD information calculating unit 50 may identify the first virtual disk X associated with the VM #1 using the processing result of the process B3.

The VM-PD information calculating unit 50 sums the VD-PD information on the first virtual disk X associated with the VM #1. There is one first virtual disk 22 associated with the VM #1 among the first virtual disks 22, namely, the first virtual disk X. Therefore, the VM-PD information obtained by summing the VD-PD information on the VM #1 is calculated to be 300 IOPS (which equals the value of the VD-PD information B8-1).

In addition, the VM-PD information calculating unit 50 may look up the second management information 62 and identify the first virtual disks 22*b* (Y) and 22*c* (Z) as being associated with the VM 24*b* (#2). Alternatively, the VM-PD information calculating unit 50 may identify the first virtual disks Y and Z associated with the VM #2 using the process result of the process B3.

The VM-PD information calculating unit 50 sums the VD-PD information on the first virtual disks Y and Z associated with the VM #2. The VM-PD information calculating unit 50 sums the VD-PD information via the first virtual disk Y (150 IOPS) and the VD-PD information via the first virtual disk Z (100 IOPS). Therefore, the VM-PD information obtained by summing the VD-PD information on the VM #2 is calculated to be 250 IPOS (which equals the value of the VD-PD information B8-2 plus the value of the VD-PD information B8-3).

The VM-PD information calculating unit 50 may store the respective plurality of pieces of VM-PD information identified (estimated) for the VMs 24 in the memory unit 41 as the calculation result 64.
(Process B10)

The communication unit 51 communicates an input or output of information or a command via a console 7 used by the user. For example, the communication unit 51 may receive (obtain) various requests from the console 7, such as an instruction for selecting the first physical disk 20. The communication unit 51 may also transmit the calculation result 64 calculated by the VM-PD information calculating unit 50 to the console 7 (e.g., display it on a screen) in the process B10.

Note that the console 7 may be an input device and an output device connected to the server 100 on which the load calculating unit 10 is executed or the load calculation server, or may be a computer different from the server 100 or the load calculation server, such as a user terminal. In the case where the console 7 is a computer, the computer may include an input device and an output device.

The input device may be used for an input of a selection instruction of the first physical disk 20. The output device may be used to display the calculation result 64 (e.g., display it on a screen on a graphical user interface (GUI)). Examples of the input device include a keyboard, a mouse, and a touch panel. Examples of the output device include a monitor, a projector, and a printer. Note that the console 7 may be a touch panel or other device that integrates the input device and the output device.

The process B10 displays the calculation result 64 on the console 7, so that the user is provided with information on I/Os of the VMs #1 and #2 accessing the first physical disk 20, including the VM #1 responsible for the increase in the load on the first physical disk 20. This allows the user to review the usage state of the indicated VM #1, thereby preventing reduction in the access performances of other VMs such as the VM #2.

(C) Example of Operation

FIG. 12 is a flowchart illustrating an example of an operation of the load calculation process by the load calculating unit 10 according to one embodiment.

As illustrated in FIG. 12, the first physical disk identifying unit 42 in the load calculating unit 10 identifies a first physical disk 20 from the plurality of physical disks 2 (Step S1).

The first virtual disk identifying unit 43 identifies, from the plurality of virtual disks 12, one or more first virtual disks 22*a* to 22*c* (X to Z) accessing the first physical disk 20 based on the first management information 61 (Step S2).

The virtual machine identifying unit 44 identifies, from the plurality of VMs 13, the VMs #1 and #2 allocated to the one or more first virtual disks X to Z based on the second management information 62 (Step S3).

The second physical disk identifying unit 45 identifies, from the plurality of physical disks 2, the second physical disks 26*a* to 26*e* associated with the one or more first virtual disks X to Z based on the first management information 61 (Step S4). The second physical disks 26*a* to 26*e* include the first physical disk 20.

The VM-VD information obtaining unit 46 looks up the information A1 on I/Os and obtains VM-VD information indicating the access load from each of the VMs #1 and #2 to the first virtual disks X to Z for each command (Step S5).

The redundancy configuration obtaining unit 47 obtains the redundancy configuration of the plurality of second physical disks 26 associated with the first virtual disks X to Z (Step S6). In one example, the redundancy configuration may be obtained from the first management information 61 (FIG. 6).

Note that the orders of execution of Steps S3 and S5 and Steps S4 and S6 are not limited to the orders illustrated in FIG. 12. For example, the load calculating unit 10 may execute Steps S3 and S5 before Steps S4 and S6, or execute Steps S4 and S6 before Steps S3 and S5. Alternatively, the load calculating unit 10 may execute Steps S3 and S5 in parallel with Steps S4 and S6.

The load ratio obtaining unit 48 obtains the access load ratio per one second physical disk 26 when one access is executed from the first virtual disk 22 based on the redundancy configuration obtained in Step S6 and the load ratio information 63 (Step S7). The access load ratio may be obtained for each command (e.g., write and read commands), and for each redundancy configuration.

The VD-PD information calculating unit 49 calculates the plurality of pieces of VD-PD information B8-1 to B8-3 indicating the access loads from the first virtual disks X to Z to the first physical disk 20 (Step S8). The VD-PD information B8-1 to B8-3 is an example of the access loads from the first virtual disk 22 (e.g., 22*a*) to the first physical disks 20 (e.g., 26*b*) in the case where the access loads from the first virtual physical disk 22 (e.g., 22*a*) to the second physical disks 26 (e.g., 26*a*, 26*b*) are equalized.

The VM-PD information calculating unit 50 calculates the plurality of pieces of VM-PD information indicating the access loads from the plurality of VMs 24*a* and 24*b* to the first physical disk 20, and stores the calculation result 64 in the memory unit 41. In one example, the VM-PD information calculating unit 50 makes the calculation by summing the VD-PD information B8-1 to B8-3 for each VM #1 or #2 allocated to the one or more first virtual disks X to Z.

The communication unit 51 outputs the calculation result 64, for example, sends it to the console 7 (Step S9), and the load calculation process ends.

Figure 13:
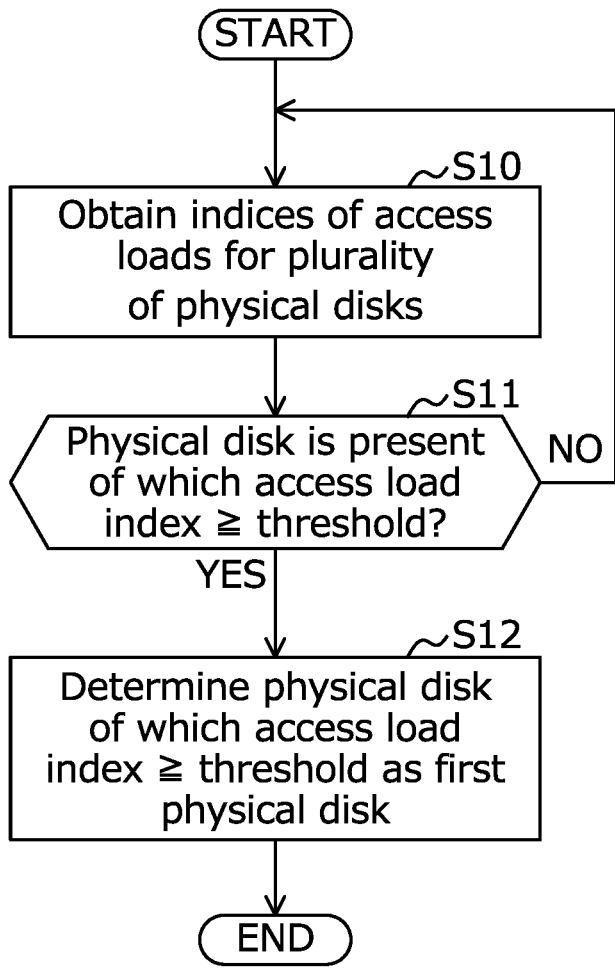
FIG. 13 is a flowchart illustrating an example of an operation of a first physical disk identification process by the load calculating unit according to one embodiment.
Figure 14:
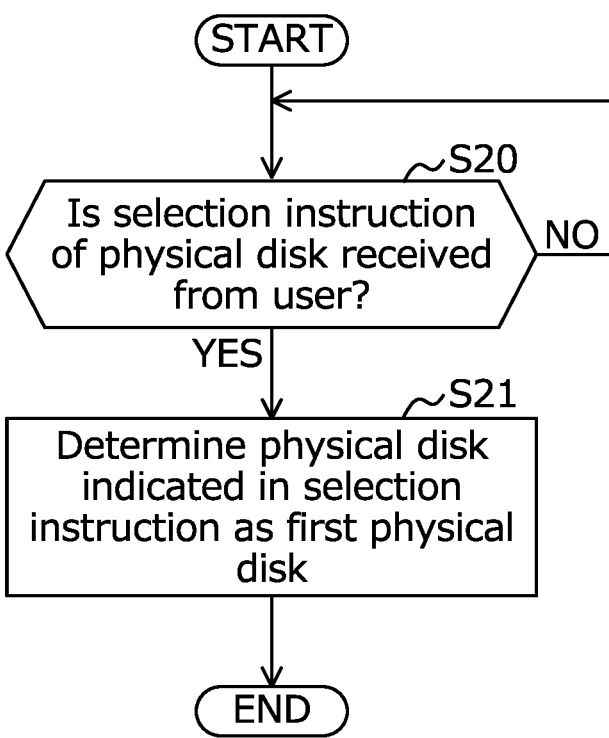
FIG. 14 is a flowchart illustrating an example of an operation of a first physical disk identification process by the load calculating unit according to one embodiment.

FIGS. 13 and 14 are flowcharts each illustrating an example of the operation of the process of identifying the first physical disk 20 by the load calculating unit 10 according to one embodiment. The flowcharts in FIGS. 13 and 14 are examples of a trigger that triggers the load calculation process illustrated in FIG. 12.

In the first example, as illustrated in FIG. 13, the first physical disk identifying unit 42 obtains respective pieces of information A4 on I/Os (see FIG. 3) of the plurality of physical disks 2 (Step S10). The information A4 on I/Os is one example of indices of the access loads.

The first physical disk identifying unit 42 determines whether or not there is any physical disk 2 of which the information A4 on I/Os obtained is equal to or greater than a certain threshold (Step S11). If there is no physical disk 2 of which the information A4 on I/Os is equal to or greater than the threshold (see NO route in Step S11), the process returns to Step S10.

If there is a physical disk 2 of which the information A4 on I/Os is equal to or greater than the threshold (see the YES route in Step S11), the process in Step S12 is executed. In Step S12, the first physical disk identifying unit 42 identifies the physical disk 2 of which the information A4 on I/Os is equal to or greater than the threshold as the first physical disk 20, and the process ends.

According to the process illustrated in FIG. 13, the physical disk 2 of which load is increased due to concentration of accesses can be identified as the first physical disk 20 in Step S1 illustrated in FIG. 12.

In the second example, as illustrated in FIG. 14, the first physical disk identifying unit 42 waits until the selection instruction of the first physical disk 20 is received from the user via the console 7 and the communication unit 51 (see Step S20 and the NO route in Step S20).

In response to the first physical disk identifying unit 42 receiving the selection instruction of the first physical disk 20 (see the YES route in Step S20), the process in Step S21 is performed.

In Step S21, the first physical disk identifying unit 42 identifies the physical disk 2 indicated in the selection instruction of the first physical disk 20, as the first physical disk 20, and the process ends.

According to the process illustrated in FIG. 14, the user can specify a desired physical disk 2 such that it is identifies as the first physical disk 20 in Step S1 illustrated in FIG. 12.

(D) Effects of One Embodiment

According to the method according to one embodiment, the load calculating unit 10 calculates a plurality of pieces of VD-PD information B8-1 to B8-3 indicating access loads from one or more first virtual disks 22 to a first physical disk 20 in the case where the access loads from the one or more first virtual disks 22 to a plurality of second physical disks 26 are equalized across the plurality of second physical disks 26. The one or more first virtual disks 22 are virtual disks 12 accessing the first physical disk 20 of the plurality of physical disks 2. The plurality of second physical disks 26 are physical disks 2 associated with the one or more first virtual disks 22, and include the first physical disk 20. In addition, the load calculating unit 10 outputs a plurality of pieces of VM-PD information which are obtained by summing the calculated plurality of pieces of VD-PD information B8-1 to B8-3 for each VM 24 allocated to one or more first virtual disks 22. The plurality of pieces of VM-PD information indicate the access loads from the respective plurality of VMs 24 to the first physical disk 20.

This facilitates identification of the VM 24*a* responsible for an increase in the load on the first physical disk 20. For example, the user can review the usage state of the VM 24*a* based on the outputted calculation result 64, thereby preventing reduction in the access performances (I/O performances) of other VMs such as the VM 24*b*.

The load calculating unit 10 identifies, from the plurality of physical disks 2, the physical disk 2 indicated in a selection that has received, as the first physical disk 20. This enables identification of the VM 24*a* responsible for an increase in the load on the first physical disk 20 to which the user is paying attention. Therefore, the usage state of the identified VM 24*a* can be reviewed, and the access load on the first physical disk 20 to which the user is paying attention can be reduced.

The load calculating unit 10 identifies a physical disk 2 of which access load is equal to or greater than the threshold as the first physical disk 20. This enables identification of the VM 24*a* responsible for an increase in the load on the first physical disk 20 where the loads are concentrated. Therefore, the usage state of the identified VM 24a can be reviewed, and the access load on the first physical disk 20 where the loads are concentrated can be reduced.

The load calculating unit 10 identifies, from the plurality of virtual disks 12, one or more first virtual disks 22 accessing the first physical disk 20 based on the first management information 61 indicating the associational relationship between the plurality of physical disks 2 and the plurality of virtual disks 12. The load calculating unit 10 identifies, from the plurality of VMs 13, one or more VMs 24 associated with the one or more first virtual disks 22 based on the second management information 62 indicating the associational relationship between the plurality of VMs 13 and the plurality of virtual disks 12. This enables identification of one or more VMs 24a and 24b associated with one or more first virtual disks 22a, 22b, and 22c from the plurality of VMs 13 while limiting an increase in overhead.

The process of calculating the plurality of pieces of VD-PD information includes obtaining VM-VD information indicating the access loads of each of write and read commands from each of the one or more virtual machines 13 to the one or more first virtual disks 22a, 22b, and 22c. The process of calculating the VD-PD information includes calculating the VD-PD information based on the information indicating the ratio of the access load according to the information indicating the redundancy configuration of the plurality of second physical disks 26, for each of the one or more first virtual disks 22a, 22b, and 22c, and based on the VM-VD information.

For example, because VMs 24 connected to the first virtual disks 22 can be identified, the load calculating unit 10 can estimate the access loads from the VMs 24 to the first physical disk 20 by summing the estimation result of the first virtual disks 22 for each VM 24. This enables identification of the VM 24a that is giving a high access load on the first physical disk 20.

In addition, the load calculating unit 10 can identify (estimate) a plurality of pieces of VM-PD information based on the first management information 61 and the second management information 62 that are maintained in the system 1 in advance. As a result, an increase in the volume of access information collected by the system 1 and an increase in the processing load (overhead) for obtaining access information are prevented.

(E) Example of Hardware Configuration

The functions of the load calculating unit 10 according to one embodiment may be embodied by one computer, or may be embodied by two or more computers. Further, at least part of the functions of the load calculating unit 10 may be embodied using a hardware (HW) resource and a network (NW) resource provided by a cloud environment.

Figure 15:
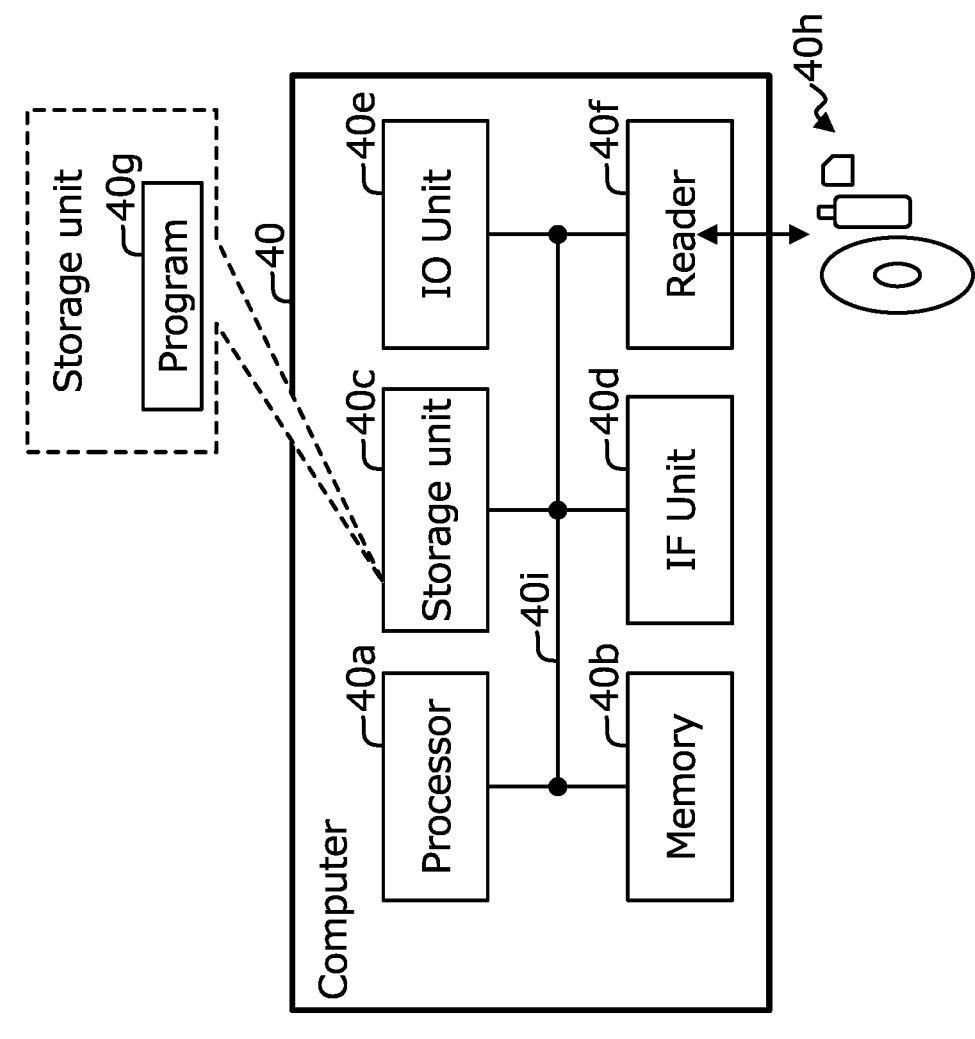
FIG. 15 is a block diagram illustrating an example of a hardware (HW) configuration of a computer embodying functions of the load calculating unit according to one embodiment.

FIG. 15 is a block diagram illustrating an example of a hardware (HW) configuration of a computer 40 embodying the functions of the load calculating unit 10 according to one embodiment. When a plurality of computers are used as HW resources for embodying the functions of the load calculating unit 10, each computer may have the HW configuration illustrated in FIG. 15.

As illustrated in FIG. 15, the computer 40 may include, by way of example, a processor 40a, a memory 40b, a storage unit 40c, an interface (IF) unit 40d, an input/output (I/O) unit 40e, and a reader 40f as the HW configuration.

The processor 40a is one example of a processing unit configured to perform a wide variety of controls and computations. The processor 40a may be communicatively connected to each other to each block in the computer 40 via a bus 40i. Note that the processor 40a may be a multiprocessor including multiple processors or a multi-core processor including multiple processor cores, or may have a configuration having multiple multi-core processors.

Examples of the processor 40a include an integrated circuit (IC), such as a CPU, an MPU, a GPU, an APU, a DSP, an ASIC, and an FPGA, for example. Note that a combination of two or more of these integrated circuits may be used as the processor 40a. CPU is an abbreviation for Central Processing Unit, and MPU is an abbreviation for Micro Processing Unit. GPU is an abbreviation for Graphics Processing Unit, and APU is an abbreviation for Accelerated Processing Unit. DSP is an abbreviation for Digital Signal Processor, ASIC is an abbreviation for Application Specific IC, and FPGA is an abbreviation for Field-Programmable Gate Array.

The memory 40b is one example of HW configured to store information, such as a wide variety of data and programs. Examples of the memory 40b include one or both of a volatile memory, such as a dynamic random access memory (DRAM), and a non-volatile memory such as a persistent memory (PM), for example.

The storage unit 40c is one example of HW configured to store information, such as a wide variety of data and programs. Examples of the storage unit 40c include a wide variety of storing apparatuses, such as magnetic disk apparatuses, e.g., an HDD, solid state drive apparatuses, e.g., an SSD, and non-volatile memories, for example. Examples of the nonvolatile memories include a flash memory, a storage class memory (SCM), and a read only memory (ROM).

The storage unit 40c may store a program 40g (information processing program, load calculation program) for embodying all or a part of the functions of the computer 40. The program 40g may include a framework such as the hypervisors 11, the VMs 13, the operating system (OS), and the like.

For example, the processor 40a can embody the functions as the load calculating unit 10 (the control unit 52 illustrated in FIG. 5), by expanding the program 40g stored in the storage unit 40c into the memory 40b and executing the program 40g expanded on the memory 40b.

The IF unit 40d is one example of a communication IF configured to carry out processing, such as controls on connections and communications with various networks, including a network between the load calculating unit 10 and apparatuses not illustrated. Examples of the apparatuses include, for example, a computer, e.g., a user terminal or a server, which provides the load calculating unit 10 with data, and a computer, e.g., a user terminal or a server, which obtains data outputted from the load calculating unit 10. The user terminal may include the console 7. The server may include the server 100.

For example, the IF unit 40d may include an adapter compliant with a local area network (LAN) such as Ethernet®, or optical communications such as Fibre Channel (FC). The adapter may support one or both of wireless and wired communication technologies.

Note that the program 40g may be downloaded from a network to the computer 40 via that communication IF and stored in the storage unit 40c.

The IO unit 40e may include one or both of an input device and an output device. Examples of the input device include, a keyboard, a mouse, and a touch panel, for example. Examples of the output device include a monitor, a projector, and a printer, for example. Alternatively, the IO unit 40*e* may include a touch panel or other device that integrates the input device and the output device.

The reader 40*f* is one example of a reader that reads data and information of a program recorded on a recording medium 40*h*. The reader 40*f* may include a connection terminal or device to which the recording medium 40*h* can be connected or inserted. Examples of the reader 40*f* include an adapter compliant with the Universal Serial Bus (USB) or any of other standards, a drive device for accessing a recording disk, and a card reader for accessing a flash memory, such as an SD card, for example. Note that the recording medium 40*h* may store the program 40*g*, and the reader 40*f* may read the program 40*g* from the recording medium 40*h* and store it in the storage unit 10*c*.

Examples of the recording medium 40*h* may include non-transitory computer-readable recording media, such as magnetic/optical disks and flash memories, for example. Examples of magnetic/optical disks may include, as an example, flexible disks, compact discs (CDs), digital versatile discs (DVDs), Blu-ray discs, and holographic versatile discs (HVDs). Examples of flash memories may include USB memories and SD cards, for example.

The HW configuration of the computer 40 described above is merely exemplary. Accordingly, in the computer 40, HW may be added or omitted (e.g., any blocks may be added or omitted), divided, or merged in any combinations, or a bus may be added or omitted, where it is deemed appropriate.

(F) Miscellaneous

The above-describe technique according to one embodiment may be practiced in the following modifications or variations.

For example, the functional blocks provided by the load calculating unit 10 may be merged in any combination, or each functional block may be divided.

In the examples illustrated in FIGS. 8 and 9, the case in which the load ratio information 63 includes access load ratios for each of write and read commands is described, but this is not limiting.

For example, the load ratio information 63 may include the access load ratio for each access type instead of or in addition to write and read commands. The access types may include, for example, sequential accesses (sequential write and sequential read) and random accesses (random write and random read).

In this case, for example, the VM-VD information obtaining unit 46 may obtain VM-VD information further classified according to whether an access for each of write and read commands is a sequential access or a random access. In addition, the VD-PD information calculating unit 49 calculates a plurality of pieces of VD-PD information B8-1 to B8-3 for each of a sequential write, a sequential read, a random write, and a random read. This enables the load calculating unit 10 to calculate VM-PD information by obtaining appropriate access load ratios for operations of random accesses and sequential accesses.

In addition, the load calculating unit 10 may be in a configuration (system) in which a plurality of apparatuses cooperate with each other via a network to embody each process function. As one example, the memory unit 41 may be a DB server and the blocks 42 to 51 may be a web server or an application server. In this case, the DB server, the application server, and the web server may cooperate with each other via a network to embody each process function as the load calculating unit 10.

In one aspect, according to the present disclosure, identification of a virtual machine responsible for an increase in the load on a physical disk is facilitated.

Throughout the descriptions, the indefinite article "a" or "an", or adjective "one" does not exclude a plurality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:

calculating a plurality of first index values indicating access loads from one or more first virtual storage devices accessing a first physical storage device of a plurality of physical storage devices, to the first physical storage device, in a case where a plurality of second physical storage devices including the first physical storage device is accessed from the one or more first virtual storage devices, the plurality of second physical storage devices being associated with the one or more first virtual storage devices; and outputting a plurality of second index values indicating access loads from a plurality of virtual machines to the first physical storage device, the plurality of second index values being obtained by summing the calculated plurality of first index values for each virtual machine associated with each of the one or more first virtual storage devices, wherein the calculating of the plurality of first index values includes:

obtaining a third index value indicating an access load for each command from each of the one or more virtual machines to the one or more first virtual storage devices; and calculating the plurality of first index values, based on information for each of the one or more first virtual storage devices indicating a ratio of an access load according to information indicating a redundancy configuration of the plurality of second physical storage devices, and based on the third index value.

2. The non-transitory computer-readable recording medium according to claim 1, the process further comprising identifying, from the plurality of physical storage devices, a selected physical storage device, as the first physical storage device.

3. The non-transitory computer-readable recording medium according to claim 1, the process further comprising identifying, from the plurality of physical storage devices, a physical storage device of which access load is equal to or greater than a threshold as the first physical storage device.

4. The non-transitory computer-readable recording medium according to claim 1, the process further comprising:

identifying, from a plurality of virtual storage devices, the one or more first virtual storage devices accessing the first physical storage device, based on first management information indicating an associational relationship between the plurality of physical storage devices and the plurality of virtual storage devices; and identifying, from the plurality of virtual machines, the one or more virtual machines associated with the one or more first virtual storage devices, based on second management information indicating an associational relationship between the plurality of virtual machines and the plurality of virtual storage devices.

5. A computer-implemented information processing method comprising:

calculating a plurality of first index values indicating access loads from one or more first virtual storage devices accessing a first physical storage device of a plurality of physical storage devices, to the first physical storage device, in a case where a plurality of second physical storage devices including the first physical storage device is accessed from the one or more first virtual storage devices, the plurality of second physical storage devices being associated with the one or more first virtual storage devices; and outputting a plurality of second index values indicating access loads from a plurality of virtual machines to the first physical storage device, the plurality of second index values being obtained by summing the calculated plurality of first index values for each virtual machine associated with each of the one or more first virtual storage devices, wherein the calculating of the plurality of first index values includes:

obtaining a third index value indicating an access load for each command from each of the one or more virtual machines to the one or more first virtual storage devices; and calculating the plurality of first index values, based on information for each of the one or more first virtual storage devices indicating a ratio of an access load according to information indicating a redundancy configuration of the plurality of second physical storage devices, and based on the third index value.

6. The computer-implemented information processing method according to claim 5, further comprising identifying, from the plurality of physical storage devices, a selected physical storage device, as the first physical storage device.

7. The computer-implemented information processing method according to claim 5, further comprising identifying, from the plurality of physical storage devices, a physical storage device of which access load is equal to or greater than a threshold as the first physical storage device.

8. The computer-implemented information processing method according to claim 5, further comprising:

identifying, from a plurality of virtual storage devices, the one or more first virtual storage devices accessing the first physical storage device, based on first management information indicating an associational relationship between the plurality of physical storage devices and the plurality of virtual storage devices; and identifying, from the plurality of virtual machines, the one or more virtual machines associated with the one or more first virtual storage devices, based on second management information indicating an associational relationship between the plurality of virtual machines and the plurality of virtual storage devices.

9. An information processing apparatus comprising:

a memory; and a processor coupled to the memory, the processor being configured to execute a process comprising:

calculating a plurality of first index values indicating access loads from one or more first virtual storage devices accessing a first physical storage device of a plurality of physical storage devices, to the first physical storage device, in a case where a plurality of second physical storage devices including the first physical storage device is accessed from the one or more first virtual storage devices, the plurality of second physical storage devices being associated with the one or more first virtual storage devices; and outputting a plurality of second index values indicating access loads from a plurality of virtual machines to the first physical storage device, the plurality of second index values being obtained by summing the calculated plurality of first index values for each virtual machine associated with each of the one or more first virtual storage devices, wherein the calculating of the plurality of first index values includes:

obtaining a third index value indicating an access load for each command from each of the one or more virtual machines to the one or more first virtual storage devices; and calculating the plurality of first index values, based on information for each of the one or more first virtual storage devices indicating a ratio of an access load according to information indicating a redundancy configuration of the plurality of second physical storage devices, and based on the third index value.

10. The information processing apparatus according to claim 9, the process further comprising identifying, from the plurality of physical storage devices, a selected physical storage device indicated in a selection that has received, as the first physical storage device.

11. The information processing apparatus according to claim 9, the process further comprising identifying, from the plurality of physical storage devices, a physical storage device of which access load is equal to or greater than a threshold as the first physical storage device.

12. The information processing apparatus according to claim 9, the process further comprising:

identifying, from a plurality of virtual storage devices, the one or more first virtual storage devices accessing the first physical storage device, based on first management information indicating an associational relationship between the plurality of physical storage devices and the plurality of virtual storage devices; and identifying, from the plurality of virtual machines, the one or more virtual machines associated with the one or more first virtual storage devices, based on second management information indicating an associational relationship between the plurality of virtual machines and the plurality of virtual storage devices.

* * * * *